United States Patent [19]
Mase et al.

[11] Patent Number: 5,688,214
[45] Date of Patent: Nov. 18, 1997

[54] TOOL CHANGING METHOD AND APPARATUS

[75] Inventors: Yoshiaki Mase, Gifu-ken; Yukihiro Sakakibara, Handa; Norimitsu Araki, Yokkaichi, all of Japan

[73] Assignee: Howa Machinery, Ltd., Nagoya, Japan

[21] Appl. No.: 631,656

[22] Filed: Apr. 2, 1996

[30] Foreign Application Priority Data

Apr. 7, 1995 [JP] Japan .................... 7-108127

[51] Int. Cl.$^6$ .................... B23Q 3/157
[52] U.S. Cl. .................... 483/1; 364/474.21; 483/8
[58] Field of Search .................... 483/1, 5, 8, 9, 483/10, 11, 6, 38, 39, 44, 45; 364/474.21

[56] References Cited

U.S. PATENT DOCUMENTS

| | | | |
|---|---|---|---|
| 3,775,837 | 12/1973 | Tomita et al. | 483/59 X |
| 4,117,586 | 10/1978 | Uchida et al. | 483/44 X |
| 4,567,659 | 2/1986 | Kitamura | 483/8 X |
| 4,631,981 | 12/1986 | Kato et al. | 483/43 X |
| 4,739,488 | 4/1988 | Asakura | 364/474.21 |
| 5,169,373 | 12/1992 | Horikawa | 483/40 |

FOREIGN PATENT DOCUMENTS

| | | | |
|---|---|---|---|
| 16977 | 2/1978 | Japan | 483/5 |
| 63-52945 | 3/1988 | Japan . | |
| 6-246572 | 9/1994 | Japan . | |

Primary Examiner—William R. Briggs
Attorney, Agent, or Firm—Ladas & Parry

[57] ABSTRACT

Tools are classified into small type tools that can pass through the space between a pair of grippers in its open position and large type tools that cannot pass through the space between the pair of grippers in the open position, when the headstock supporting a spindle holding a tool is moved to a position corresponding to a tool change position. When the next tool to be used is of the small type, the tool is moved through a standby position to the tool change position during a machining operation using the tool on the spindle, the headstock is moved to the position corresponding to the tool change position in response to a tool changing instruction and a predetermined tool changing operation is carried out. When the next tool is of the large type, the next tool is positioned and held at the standby position during a machining operation, the headstock is moved to the position corresponding to the tool change position, the next tool is moved to the tool change position and the tool changing operation is carried out.

5 Claims, 13 Drawing Sheets

TOOL CHANGING METHOD AND APPARATUS

BACKGROUND OF THE INVENTION

1. Field of the Invention

The present invention relates to a tool changing method to be carried out in a machining center and the like and a tool changing apparatus for carrying out the tool changing method.

2. Description of the Related Art

A machining center disclosed in JP-A-63-52945 published Mar. 7, 1988, employs a tool magazine disposed on the column of the machining center and capable of sequentially positioning a plurality of tools at a standby position and of shifting a desired tool from the standby position to a tool change position, and a tool changing device mounted on a headstock vertically slidably supported on the column. The tool changing device has a tool changing head capable of turning about the axis of the spindle and of moving toward and away from the axis of the spindle, two pairs of grippers supported on the tool changing head so as to extend in diametrically opposite directions, respectively. One of the two pair of grippers is at a position to grip an on-spindle tool, i.e., a tool attached to the spindle, and the other pair of grippers is at a position to grip the tool positioned at the tool change position when the headstock is raised to a position corresponding to the tool change position.

When changing the tool by the tool changing device, the tool magazine positions the next tool at the standby position and moves the next tool to the tool change position while the machining center is in operation using the on-spindle tool. When a tool changing instruction is given, the headstock is raised to the position corresponding to the tool change position, one of the two pairs of grippers grips the on-spindle tool, the other pair of grippers grips the next tool positioned at the tool change position, the tool changing device carries out a tool changing operation to replace the on-spindle tool with the next tool, the headstock supporting the spindle holding the next tool is moved along the axis of the spindle toward a machining position, the tool removed from the spindle is moved from the tool change position to the standby position, and then the tool magazine carries out a tool positioning operation for positioning the next tool at the standby position for the next tool changing cycle.

This prior art machining center was developed to machine steel workpieces by using tools of tool diameters not greater than 53 mm. When machining workpieces of light alloys on the machining center, tools of tool diameters greater than 53 mm, for example 75 mm, must be used because the amount of chips increases when workpieces of light alloys are machined by using tools of diameters not greater than 53 mm. Since the stroke of each pair of grippers is determined such that the pair of grippers make only a movement enough for the pair of grippers to grip a tool of 53 mm in tool diameter to shorten the time necessary for gripping and releasing the tool to the least possible extent. Accordingly, if the next tool of 75 mm in tool diameter is positioned at the tool change position, the pair of grippers will interfere with the next tool when the headstock is moved along the axis of the spindle to the position corresponding to the tool change position in response to a tool changing instruction.

Such a problem may be solved by a first measure that increases the stroke of the pair of grippers so that the pair of grippers are able to grip the tool of 75 mm in tool diameter or by a second measure that positions the next tool at the standby position, holds the next tool at the standby position until the headstock is positioned at the position corresponding to the tool change position in response to a tool changing instruction, moves the next tool from the standby position to the tool change position, carries out the tool changing operation, and then moves the headstock to a machining position after moving the tool removed from the spindle to the standby position.

When the first measure were taken, the design of the grippers would have to be changed and the time necessary for the grippers to grip and release the tool would increase and the idle time for which the machining center is not cutting the workpiece would increase. When the second measure were taken, the next tool would have to be moved from the standby position to the tool change position before the tool changing operation and the tool removed from the spindle would have to be moved from the tool change position to the standby position after the tool changing operation in each tool changing cycle and, consequently, the idle time for which the machining center is not cutting the workpiece would increase.

SUMMARY OF THE INVENTION

Accordingly, it is an object of the present invention to provide a tool changing method that requires the least possible stroke of grippers and the least possible tool transferring actions before and after a tool changing operation, and to provide an apparatus for carrying out the same tool changing method.

According to a first aspect of the present invention, there is provided a tool changing method which comprises: classifying a plurality of tools into small type tools and large type tools with reference to a predetermined threshold tool diameter determined on the basis of the stroke of pairs of grippers; positioning a next tool to a standby position, and moving the same to a tool change position before the headstock of the machining center has been moved to a position corresponding to the tool change position in response to a tool changing instruction, when the next tool is of the small type; positioning and holding the next tool at the standby position, moving the next tool from the standby position to the tool change position after the headstock has been moved to the position corresponding to the tool change position in response to a tool changing instruction, and carrying out the tool changing operation, when the next tool is of the large type; carrying out the tool changing operation, moving the headstock, immediately after completion of the tool changing operation, to a machining position and then moving the tool removed from the spindle from the tool change position to the standby position, when the tool removed from the spindle is of the small type; carrying out the tool changing operation, and moving the headstock to the machining position after moving the tool removed from the spindle from the tool change position to the standby position, when the tool removed from the spindle is of the large type.

According to an embodiment of the present invention, the tools that can be moved through a space between the grippers in an open position are classified as those of small type, and the tools that cannot be moved through the same space are classified as those of the large type.

According to another embodiment of the present invention, the small type tools of a weight exceeding a predetermined weight are classified as large type tools, and the tool changing operation for replacing an on-spindle tool with a next tool, in a case where at least one of the on-spindle tool and the next tool is of the large type is carried out at a tool changing speed lower than a tool changing speed in a case where both the tools are of the small type.

According to another aspect of the present invention, a tool changing apparatus comprises: storage means for storing types of tools classified into small type tools and large type tools with reference to a predetermined threshold tool diameter determined on the basis of stroke of a pair of grippers; type identifying means for identifying the respective types of an on-spindle tool and a next tool; small type tool feed instruction issuing means for issuing a small type tool feed instruction to move the next tool from a standby position to a tool change position before the headstock is moved to a position corresponding to the tool change position, when the next tool is of the small type; large type tool feed instruction issuing means for issuing a large type tool feed instruction to move the next tool from the standby position to the tool change position after the headstock has been moved to the position corresponding to the tool change position, when the next tool is of the large type; small type tool return instruction issuing means for issuing a small tool return instruction to return the tool removed from the spindle by the tool changing operation from the tool change position to the standby position after the headstock has been moved toward a machining position when the tool removed from the spindle is of the small type; and large type tool return instruction issuing means for issuing a large tool return instruction to return the tool removed from the spindle by the tool changing operation from the tool change position to the standby position before the headstock is moved toward a machining position, when the tool removed from the spindle is of the large type.

According to the present invention, when the next tool is of the small type, the next tool is positioned at the standby position and moved to the tool change position while the machine tool is in operation using the on-spindle tool, the headstock is moved to the position corresponding to the tool change position in response to a tool changing instruction, and the tool changing operation is carried out. When the next tool is of the large type, the next tool is moved to and held at the standby position while the machining center is in machining operation, the next tool is moved from the standby position to the tool change position after the headstock has been moved to the position corresponding to the tool change position in response to a tool changing instruction and the tool changing operation is carried out. When the tool removed from the spindle is of the small type, the headstock is moved to a machining position immediately after the tool changing operation has been completed and the tool removed from the spindle is moved from the tool change position to the standby position. When the tool removed from the spindle is of the small type, the headstock is moved to a machining position after the tool removed from the spindle by the tool changing operation has been removed from the tool change position to the standby position.

Accordingly, the idle time for which the machining center remains inoperative can be limited to a minimum even if the stroke of the pair of grippers of the tool changing device is increased to enable the pair of grippers to grip the large type tools and the time necessary for the pair of grippers to grip and release the tool increases accordingly. Furthermore, since the tool changing operation for replacing the on-spindle tool with the next tool in the case where at least either the on-spindle tool or the next tool is of the large type is carried out at a tool changing speed lower than that at which the tool changing operation is carried out in the case where both the tools are of the small type, excessively large force will not be exerted on the component parts of the tool changing device and the tool will not fall off the pair of grippers during the tool changing operation.

The above and other objects, features and advantages of the present invention will become more apparent from the following description taken in connection with the accompanying drawings.

DETAILED DESCRIPTION OF THE PREFERRED EMBODIMENTS

Figure 1:
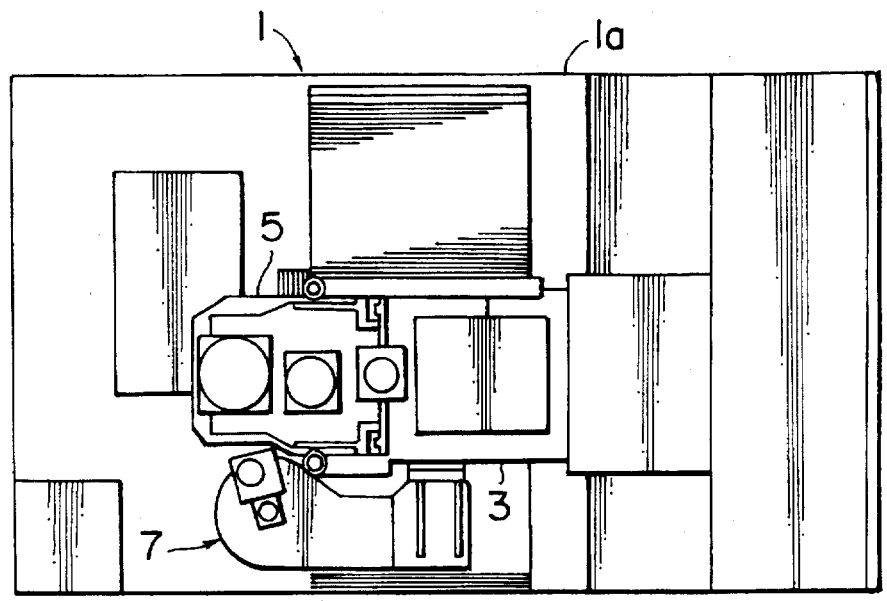
FIG. 1 is a plan view of a machining center.
Figure 2:
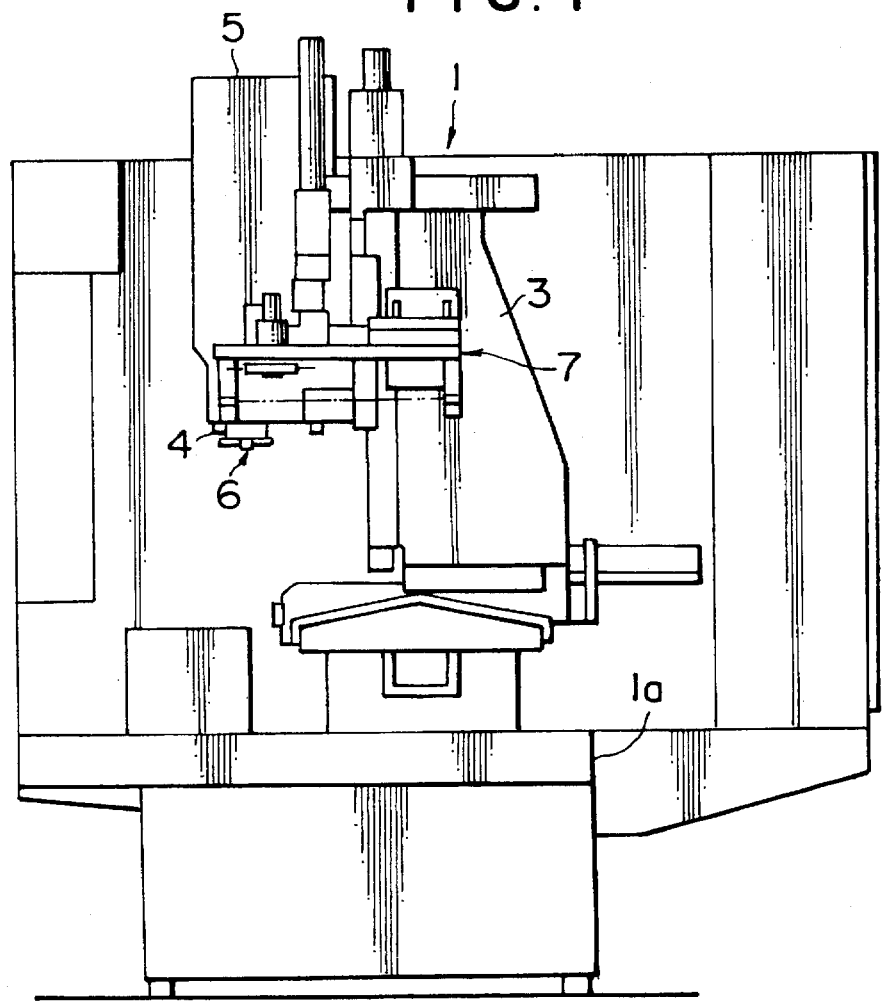
FIG. 2 is a side view of the machining center of FIG. 1.
Figure 3:
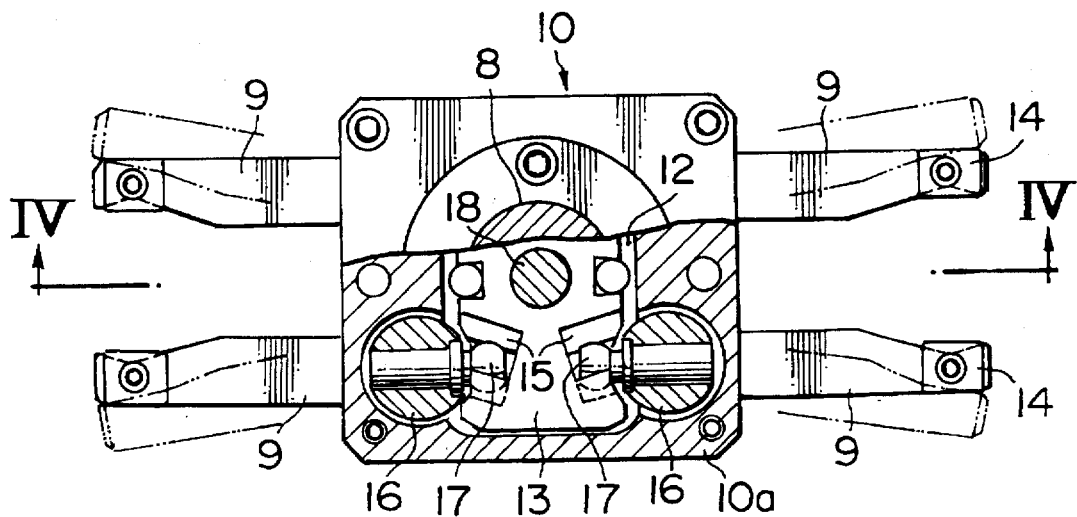
FIG. 3 is a partly sectional plan view of a tool changing head.

A tool changing method according to a preferred embodiment of the present invention will be described as applied to a vertical machining center 1. Referring to FIGS. 1 and 2, the machining center 1 has a main frame 1a a column 3 supported for movement in longitudinal and transverse directions in a horizontal plane on the main frame 1a, and a headstock 5 supported for vertical sliding movement, i.e., sliding movement along the axis of a spindle 4, on the column 3. A tool changing device 6 is disposed near the spindle 4 supported in a vertical position on the headstock 5. A tool magazine 7 is disposed beside the column 3. First, the tool changing device 6 will be described with reference to FIGS. 3 to 5. Fundamentally, the tool changing device 6 is the same in construction as a tool changing device disclosed in JP-A-63-52945. A tool change shaft 8 is supported in vertical attitude on the headstock 5 so as to be turned about and to be moved toward and away from the axis of the spindle 4, and a tool changing head 10 provided with two pairs of grippers 9 is mounted on the lower end of the tool change shaft 8.

A base member 10a is attached to the lower end of the tool change shaft 8. The two pairs of grippers 9 are pivotally supported at their proximal ends 16 for turning about vertical axes on the opposite side walls of the base member 10a so as to extend in opposite directions, respectively. A first pair of grippers 9 are shown to be positioned at a on-spindle tool gripping position to grip an on-spindle tool, and a second pair of grippers 9 are shown to be positioned at a next tool gripping position to grip the next tool positioned at a tool change position Q to be described later when the headstock 5 is positioned at a tool change position A which will also be described later. The inner surfaces of the extremities of each pair of grippers 9 facing each other are fixedly provided with tool holding projections 14 that engage recesses 11 formed in the tool T, respectively. The diameter of the tool T does not change substantially in the region 11 the recesses 11 regardless of whether the tool is of a small type or a large type which will be described hereinafter.

Figure 4:
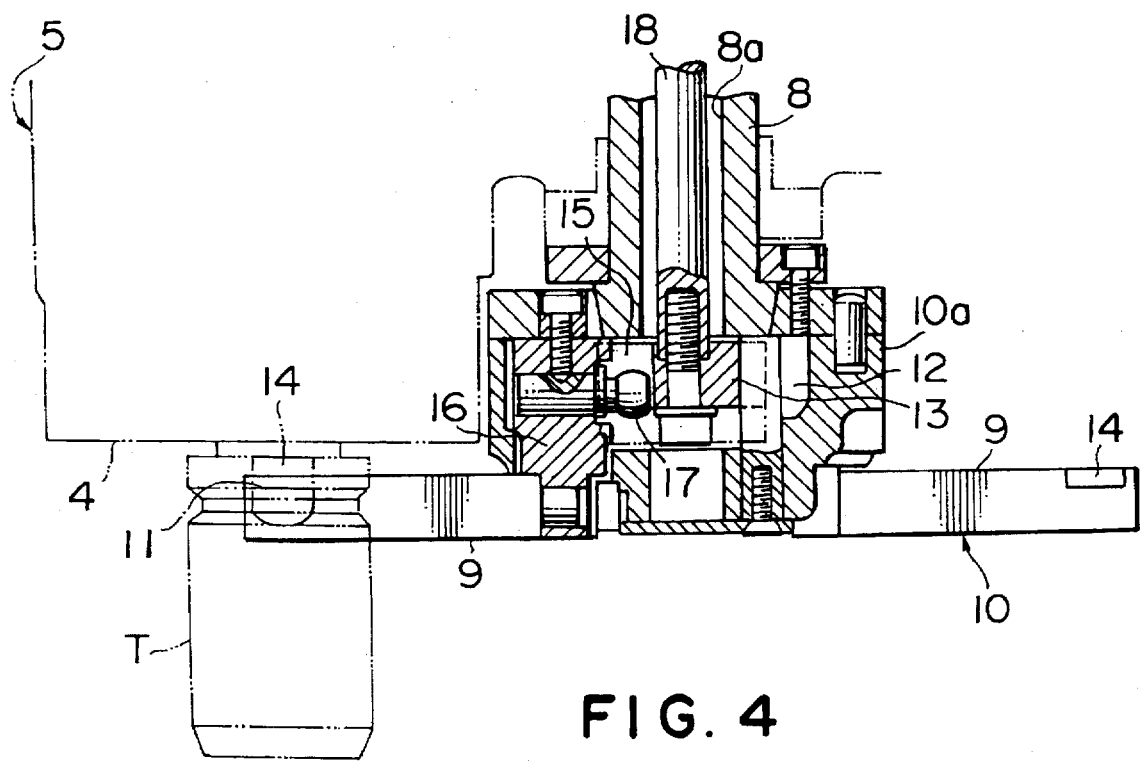
FIG. 4 is a sectional view taken on line IV—IV in FIG. 3.
Figure 5:
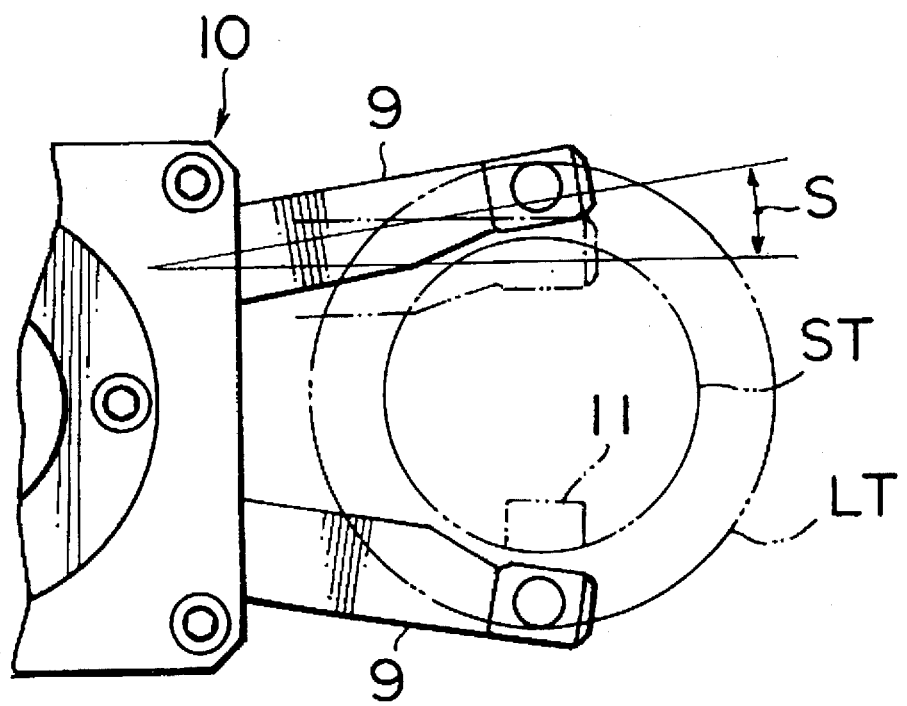
FIG. 5 is a fragmentary plan view of the tool changing head of FIG. 3, for assistance in explaining the angular stroke of grippers included in the tool changing head.

A cam member 13 is disposed in a chamber 12 defined in the base member 10a so as to be vertically slidable between an upper position indicated by solid lines and a lower position indicated by imaginary lines in FIG. 4. The lower end of an operating rod 18 extends vertically slidably in a central bore 8a of the tool change shaft 8 and is fastened to the upper surface of the cam member 13 with a screw. The cam member 13 is provided with sloping cam grooves 15 for operating the grippers 9. Gripper operating members 17 fixed to the proximal ends 16 of the grippers 9 are in engagement with the cam grooves 15, respectively. Thus, each gripper 9 will be turned about the vertical axis between a gripping position indicated by solid lines and a releasing position indicated by imaginary lines in FIG. 3 when the operating rod 18 is moved vertically. As shown in FIG. 5, the angular stroke S, i.e., the turning range, of each gripper 9 for gripping and releasing the tool is a smallest possible angle only necessary for gripping and releasing the tool.

Figure 6:
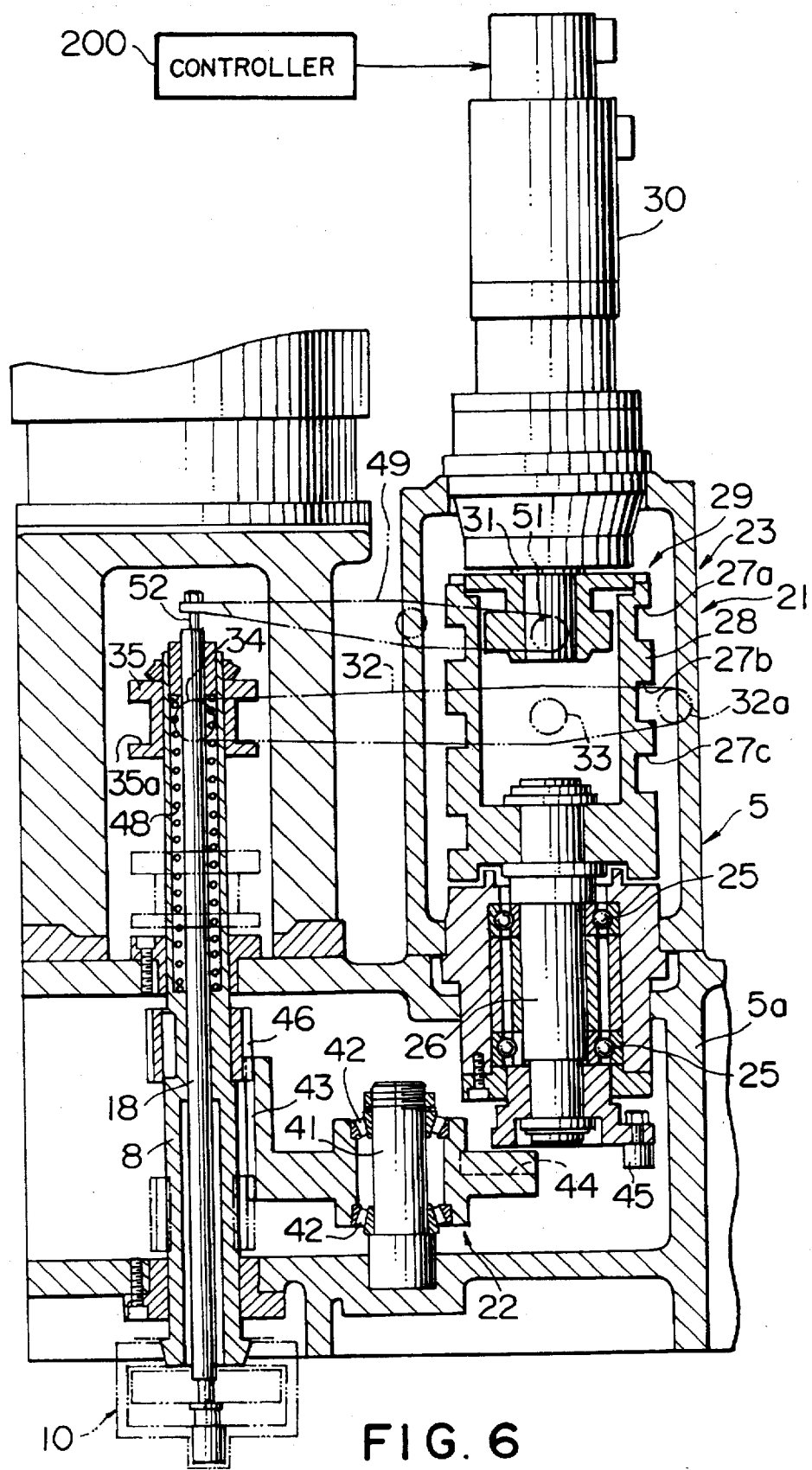
FIG. 6 is a longitudinal sectional view of a headstock.

FIG. 6 shows a tool change shaft lifting mechanism 21 for vertically moving the tool change shaft 8, a tool change shaft turning mechanism 22 for turning the tool change shaft 8, and an operating rod lifting mechanism 23 for vertically moving the operating rod 18. The tool change shaft lifting mechanism 21 has a shaft 26 supported for rotation in bearings 25 on the body 5a of the headstock 5. A cylindrical cam 28 provided with three cam grooves, i.e., a first cam groove 27a, a second cam groove 27b and a third cam groove 27c, in its outer circumference is fixed to the upper end of the shaft 26. The upper end of the cylindrical cam 28 is connected to the drive shaft 31 of a motor 30 by a coupling 29. A cam follower 33 pivotally supported on the middle portion of a cam lever 32 is shown to be in engagement with the second cam groove 27b of the cylindrical cam 28. The cam lever 32 has one end 32a pivotally supported on the body 5a of the headstock 5, and the other end provided with a roller 34. The roller 34 is in engagement with a groove 35a formed in an engagement member 35. When the cylindrical cam 28 makes one full turn, the second cam groove 27b turns the cam lever 32 so that the tool change shaft 8 will be lowered by a predetermined distance.

The tool change shaft turning mechanism 22 has a support shaft 41 fixedly held on the body 5a of the headstock 5, and a drive gear 43 is supported for rotation on bearings 42 mounted on the support shaft 41. The drive gear 43 is provided with a groove 44 in part of its periphery. A roller 45 is supported rotatably on the lower end of the shaft 26 so as to be brought into engagement with the groove 44. A driven gear 46, which engages with the drive gear 43, is fixed to the middle portion of the tool change shaft 8. When the shaft 26 makes one full turn, the tool change shaft 8 is turned through an angle of 180°.

The operating rod lifting mechanism 23 will be described below. A spring 48 is interposed between the operating rod 18 and the tool change shaft 8 to bias the operating rod 18 upward relative to the tool change shaft 8. A cam lever 49 is supported pivotally at its middle portion on the body 5a of the headstock 5. A cam follower 51 pivotally supported on one end of the cam lever 49 is in engagement with the first cam groove 27a of the cylindrical cam 28, and a pressing member 52 fixed to the other end of the cam lever 49 is pressed against the upper end of the operating rod 18 biased upward by the spring 48. When the cylindrical cam 28 makes one full turn at a predetermined phase of operation, the first cam groove 27a makes the cam lever 49 turn to move the operating rod 18 up and down so that the grippers 9 are turned for gripping and releasing operations. The motor 30 for driving those mechanisms 21, 22 and 23 for operation is a servomotor capable of driving those mechanisms 21, 22 and 23 for operations at different driving speeds when handling a large type tool LT and a small type tool ST.

Figure 7:
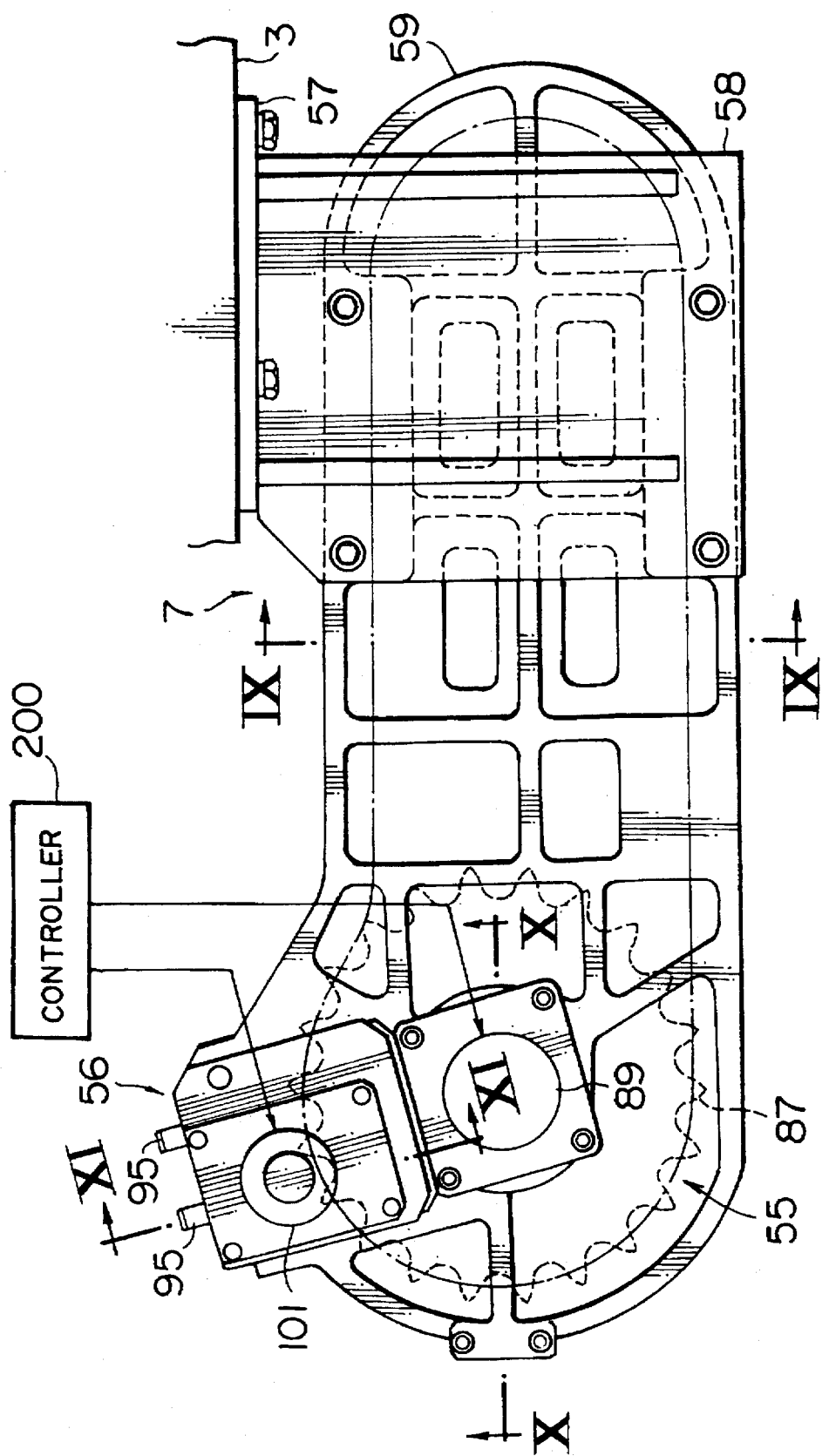
FIG. 7 is a plan view of a tool magazine.
Figure 8:
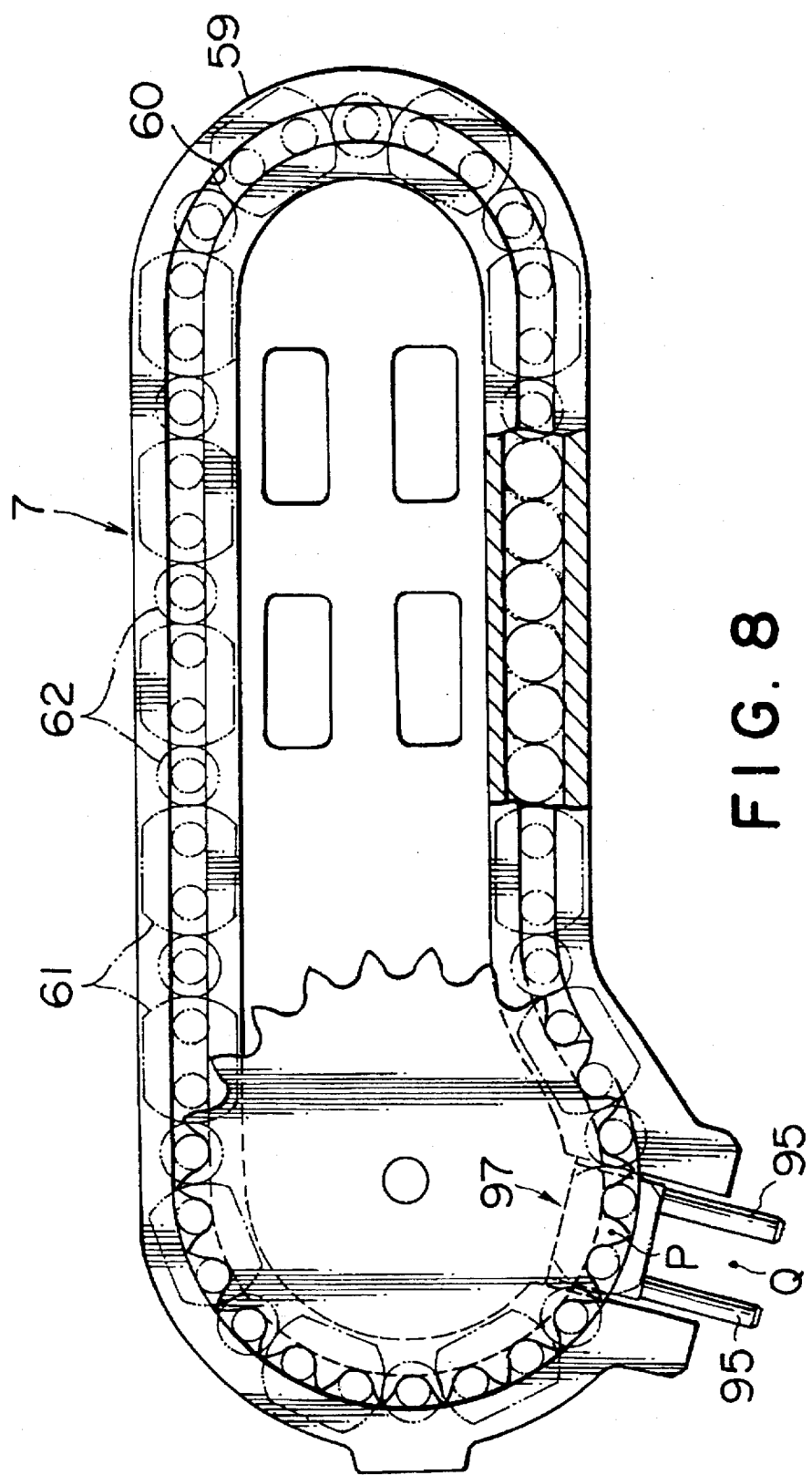
FIG. 8 is a bottom view of the tool magazine of FIG. 7.
Figure 9:
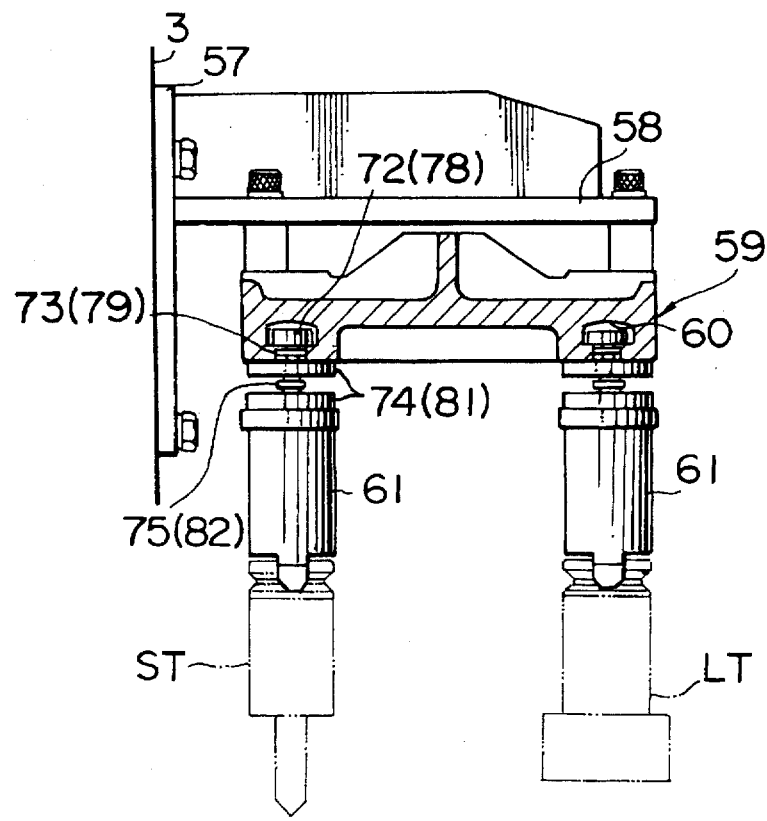
FIG. 9 is a sectional view taken on line IX—IX in FIG. 7.

The tool magazine 7 will be described with reference to FIGS. 7 to 12. The tool magazine 7 is substantially the same in fundamental construction as a tool magazine disclosed in JP-A-6-246,572 published Sep. 6, 1994 and is provided with a feed mechanism 55 and a pot extracting mechanism 56. As shown in FIGS. 7 and 9, a magazine body 59 has a base end fastened to a bracket 58 which has a mounting plate 57 attached to the side surface of the column 3. A noncircular guide groove 60 having a cross section as shown in FIG. 9 is formed in the periphery of the lower surface of the magazine body 59. The guide groove 60 is continuous but is interrupted at a cutout portion 97 as shown in FIG. 8. A plurality of tool pots 61 (sixteen tool pots in this embodiment) and idlers 62 are arranged alternately in succession and in contact with each other in the guide groove 60 so as to be horizontally movable. As shown in FIG. 12, As shown in FIG. 12, each tool pot 61 has a pot body 61a provided with a tapered hole 65 for receiving the tapered shank 64 of a tool T, balls 67 and springs 68. The springs 68 urge the balls 67 into engagement with the pull stud 66 of the tool T to hold the tool T on the pot body 61a.

As shown in FIG. 9, tools T to be held on the tool pots 61 are classified into small type tools ST having diameters of 53 mm or below and large type tools LT having diameters greater than 53 mm. In this embodiment, tools of diameters of 53 mm or below having weights of 1.5 kgf or above are included in the group of large type tools LT.

As shown in FIG. 12, two rods 71 each having one threaded end are screwed in the upper end of the pot body 61a of each tool pot 61 in an upright attitude. A circular head member 72, a guide roller 73 (bearing), a pair of contact plates 74 and an engagement roller 75 (bearing) are mounted on each rod 71. Each idler 62 is constructed by mounting a head member 78, a guide roller 79 (bearing), an engagement roller 82 (bearing) and a pair of contact plates 81 on a rod 77. The head member 78, the guide roller 79 and the engagement roller 82 of the idler 62 are identical in shape and size with the head member 72, the guide roller 73 and the engagement roller 75 of the tool pot 61, respectively. The pair of contact plates 81 of the idler 62 are different in shape and size from the pair of contact plates 74 of the tool pot 61.

As shown in FIG. 9, the respective head members 72 and 78 of the tool pot 61 and the idler 62 are inserted in the wide portion of the guide groove 60 to suspend the tool pot 61 and the idler 62 from the magazine body 59, and the guide rollers 73 and 79 are in contact with the inner surfaces of the inner flanges of the magazine body 59 defining a narrow portion of the guide groove 60 to guide the tool pot 61 and the idler 62 for movement along the guide groove 60. The pair of contact plates 74 of the tool pot 61 and the pair of contact plates 81 of the idler 62 are in end-to-end abutment, respectively. The engagement rollers 75 and 82 come into engagement with a sprocket 87 included in the feed mechanism 55.

Figure 10:
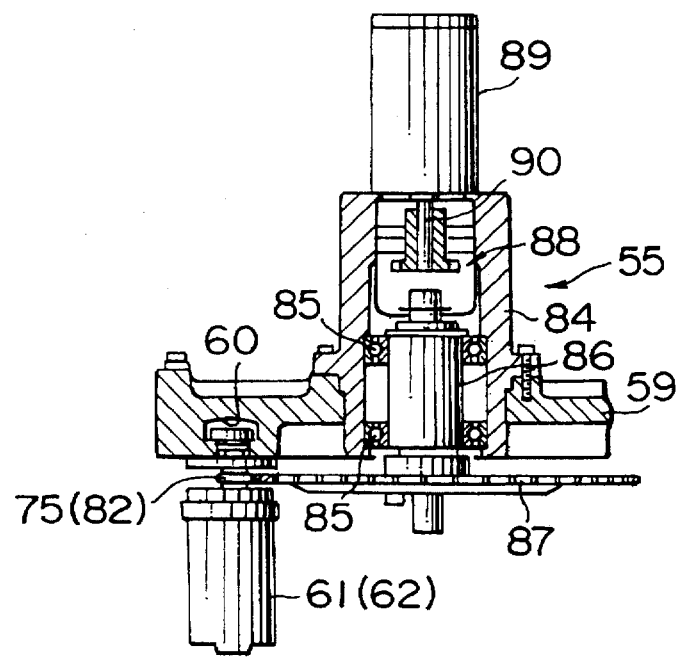
FIG. 10 is a sectional view taken on line X—X in FIG. 7.

Referring to FIG. 10, the feed mechanism 55 has a shaft 86 supported for rotation in bearings 85 on the boss 84 of the magazine body 59, the sprocket 87 fixedly mounted on the lower end of the shaft 86, a reduction gear 88 and a reversible indexing motor 89 having a drive shaft 90. The reduction gear 88 has an output shaft coupled with the shaft 86, and an input shaft coupled with the drive shaft 90 of the indexing motor 89. The indexing motor 89 drives the sprocket 87 for rotation to drive the tool pots 61 in engagement with the sprocket 87 so that the tool pots 61 and the idlers 62, which are arranged successively and contiguously, are moved along the guide groove 60 to position the tool pot 61 holding a desired tool T at a standby position P.

Figure 11:
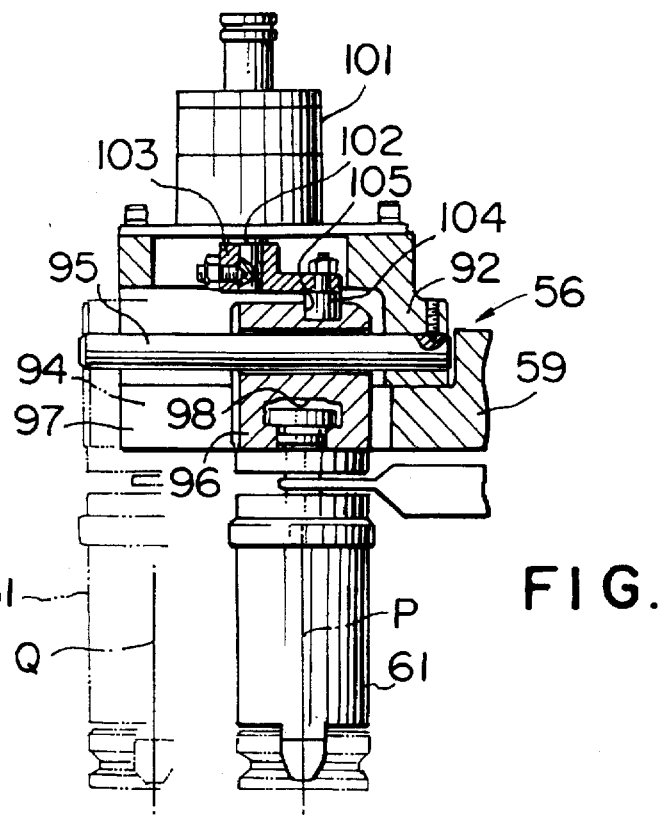
FIG. 11 is a sectional view taken on line XI—XI in FIG. 7.
Figure 12:
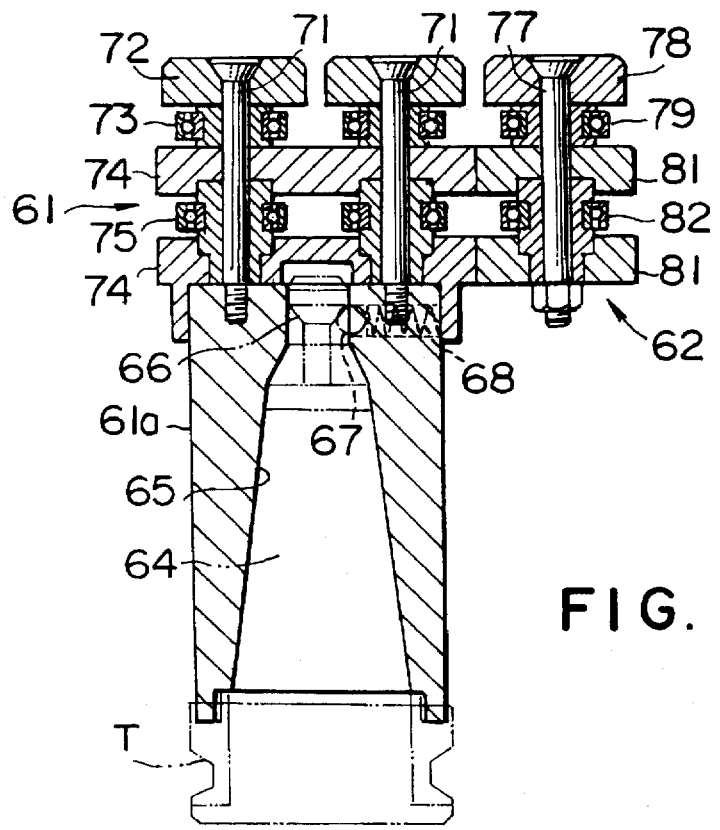
FIG. 12 is a longitudinal sectional view of a tool pot and an idler.

Referring to FIG. 11, the pot extracting mechanism 56 has a frame 92 fixed to the magazine body 59 and provided with a space 94 opening toward the spindle 4 of the machining center 1. Two guide rods 95 are held so as to extend in a horizontal position in the space 94 and to project outward from the magazine body 59, and a slider 96 is supported on the guide rods 95 for sliding movement between the standby position P and a tool change position Q. The lower portion of the slider 96 lies in the cutout portion 97 formed in the lower surface of the magazine body 59 and is provided with a support groove 98, which is the same in cross section as the guide groove 60. When the slider 96 is positioned at the standby position P, the support groove 98 is continuous with the guide groove 60 so that the tool pot 61 can be transferred from the guide groove 60 to the support groove 98.

A pot extracting motor 101 is mounted on the upper surface of the frame 92, and a swing arm 103 is attached to the output shaft 102 of the pot extracting motor 101. A roller 104 is supported pivotally on the extremity of the swing arm 103 and is fitted in an elongate groove 105 formed in the upper surface of the slider 96. When the swing arm 103 is driven for turning by the pot extracting motor 101, the roller 104 fitted in the elongate groove 105 shifts the slider 96 between the standby position P and the tool change position Q.

Figure 15:
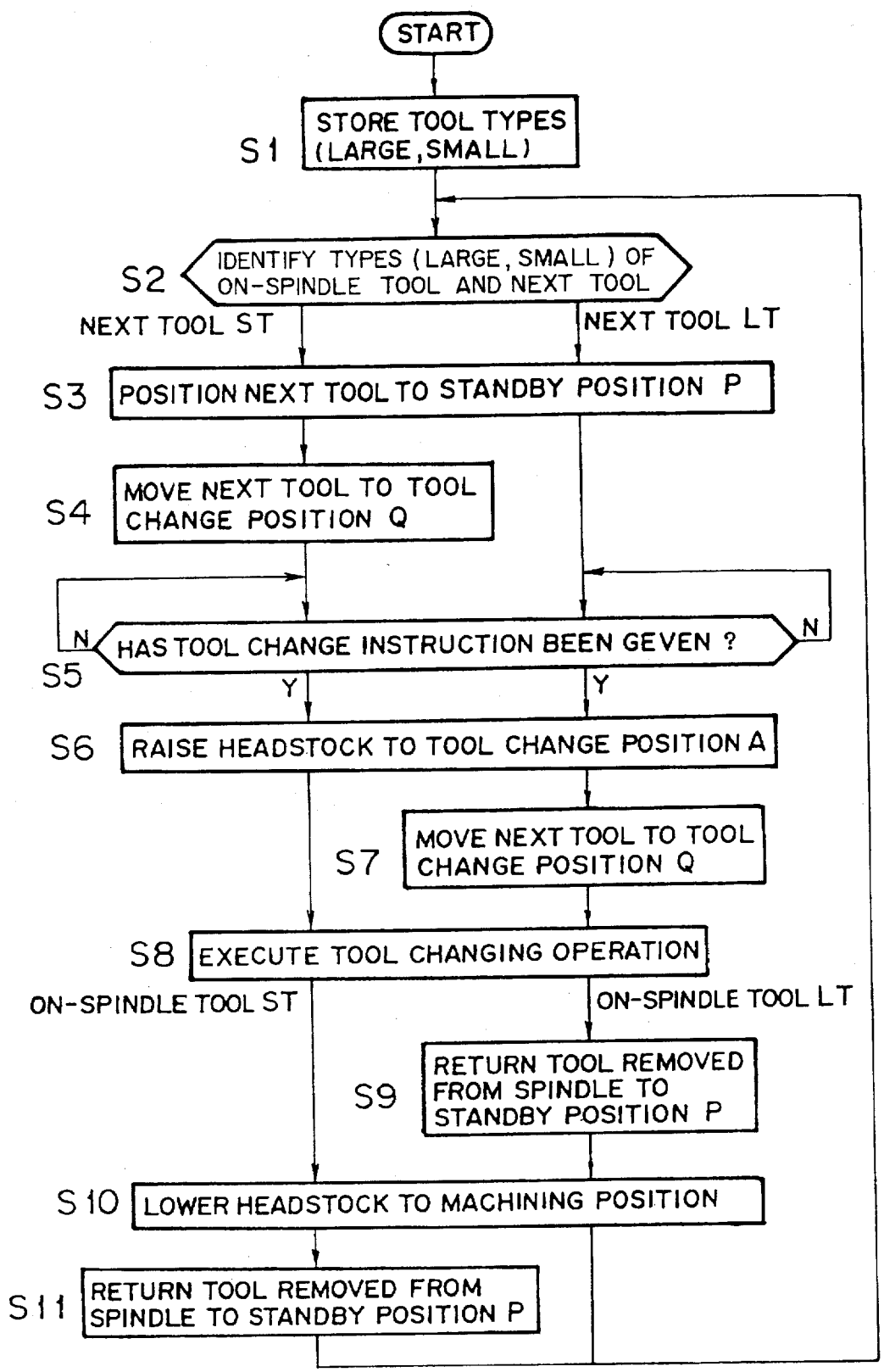
FIG. 15 is a flow chart of a tool changing method in a preferred embodiment of the present invention.

The functions of a controller 200 (FIG. 7) connected to the indexing motor 89 of the feed mechanism 55 and the extracting motor 101 of the pot extracting mechanism 56 will be described with reference to a flow chart shown in FIG. 15.

In step S1, the controller 200 stores the types of the tools, i.e., large type tools LT and small type tools ST, held by the tool pots 61. Step S1 is carried out by a storage means. In step S2, the respective types of the on-spindle tool and the next tool to replace the on-spindle tool in the next tool changing cycle are identified. Step 2 is carried out by a type discriminating means. When the next tool is discriminated or identified as the small type tool ST in step S2, the next tool is indexed or positioned at the standby position P in step S3 and is moved to the tool change position Q in step S4. When a tool changing instruction is given in step S5, the headstock 5 is raised to a tool change position A (FIG. 13(b)) in step S6, and a predetermined tool changing operation is carried out in step S8. Step S4 is carried out by a small type tool feed instruction issuing means. When the next tool is identified as the large type tool LT in step S2, the next large type tool is positioned and held at the standby position P in step S3. When a tool changing instruction is given in step S5, the headstock 5 is raised to the tool change position A in step S6, the next tool is transferred from the standby position P to the tool change position Q in step S7, and the predetermined tool changing operation is carried out in step S8. Step S7 is carried out by a large type tool feed instruction issuing means.

In case the on-spindle tool is identified as the small type tool ST in step S2, the headstock 5 is lowered to a machining position in step S10 immediately after the completion of the tool changing operation in step S8, and then the tool removed from the spindle 4 is returned from the tool change position Q to the standby position P in step S11. Step S11 is carried out by a small type tool return instruction issuing means. When the on-spindle tool is identified as the large type tool LT in step S2, the tool removed from the spindle 4 is returned from the tool change position Q to the standby position P in step S9, and then the headstock 5 is lowered toward a machining position in step S10. Step S9 is carried out by a large type tool returning instruction issuing means.

Figure 13C:
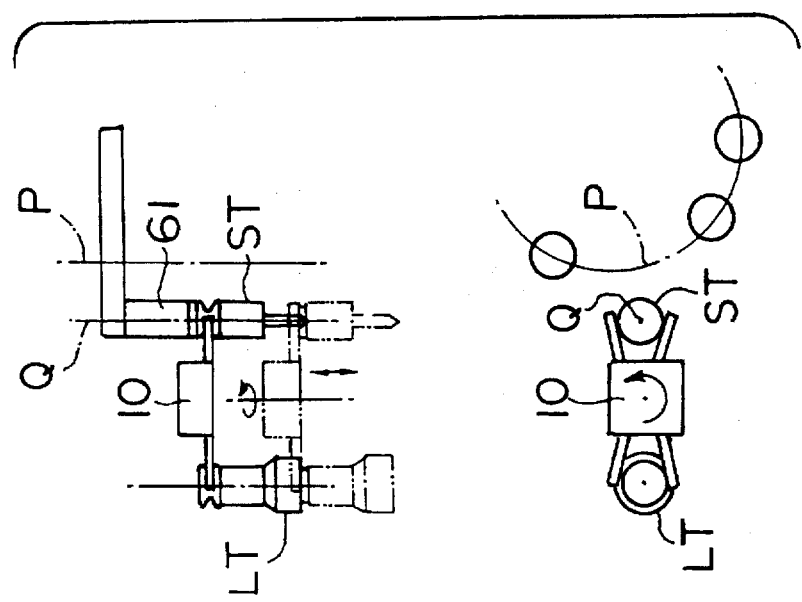
FIGS. 13(a) to 13(e) are diagrammatic views explanatory of a tool changing operation.

The above steps of the tool changing method executed by the machining center 1 will be described more specifically with reference to FIGS. 13(a) to 13(e). The controller 200 executes a preparatory task in step S1 to store the types of the tools held by the tool pots 61 to classify the tools into large type tools LT and small type tools ST. The tool changing method will be described on an assumption that the on-spindle tool held on the spindle 4 is a large type tool LT and the next tool is a small type tool ST. In step S2, the controller 200 identifies the next tool as the small type tool ST. As shown in FIG. 13(a), the feed mechanism 55 positions the next small type tool ST at the standby position P in step S3 and the pot extracting mechanism 56 transfers the next small type tool ST from the standby position P to the tool change position Q in step S4 during machining operation using the large type tool LT held on the spindle 4.

Figure 13B:
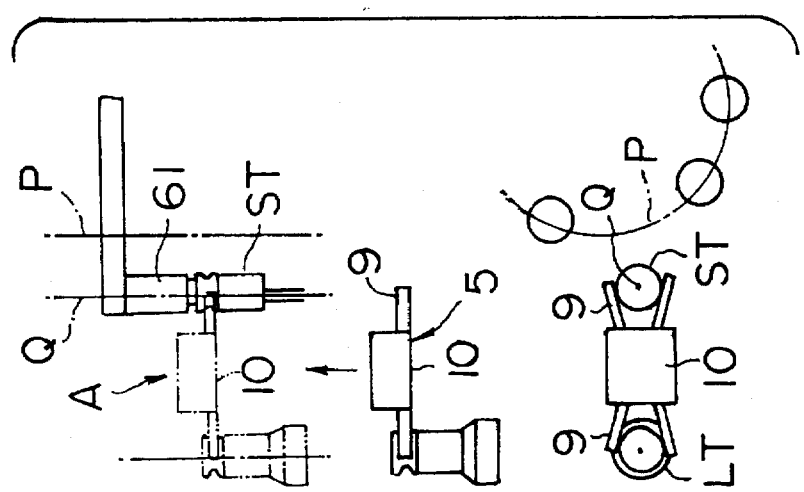
Figure 13A:
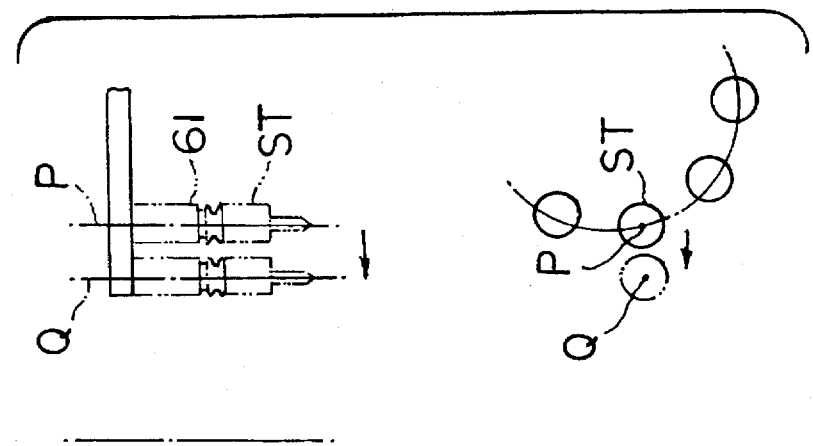

Then, when a tool changing instruction is given in step S5, the headstock 5 is raised to the tool change position A in step S6 as shown in FIG. 13(b). The pair of grippers 9 of the tool changing head 10 at the side of the small type tool ST positioned at the tool change position Q are open so that the pair of grippers 9 do not interfere with the small type tool ST. Then, in step S8, the tool changing head 10 carries out the predetermined tool changing operation, as shown in FIG. 13(c), in which the two pairs of grippers 9 grips the on-spindle large type tool LT and the next small type tool ST positioned at the tool change position Q, respectively, the tool changing head 10 is lowered by a predetermined distance relative to the headstock 5 to pull out the large type tool LT from the spindle 4 and the small type tool ST from the tool pot 61, the tool changing head 10 is turned through an angle of 180°, the tool changing head 10 is raised to mount the next small type tool ST on the spindle 4 and to mount the large type tool LT on the tool pot 61, and then the two pairs of grippers 9 are opened.

Figure 13E:
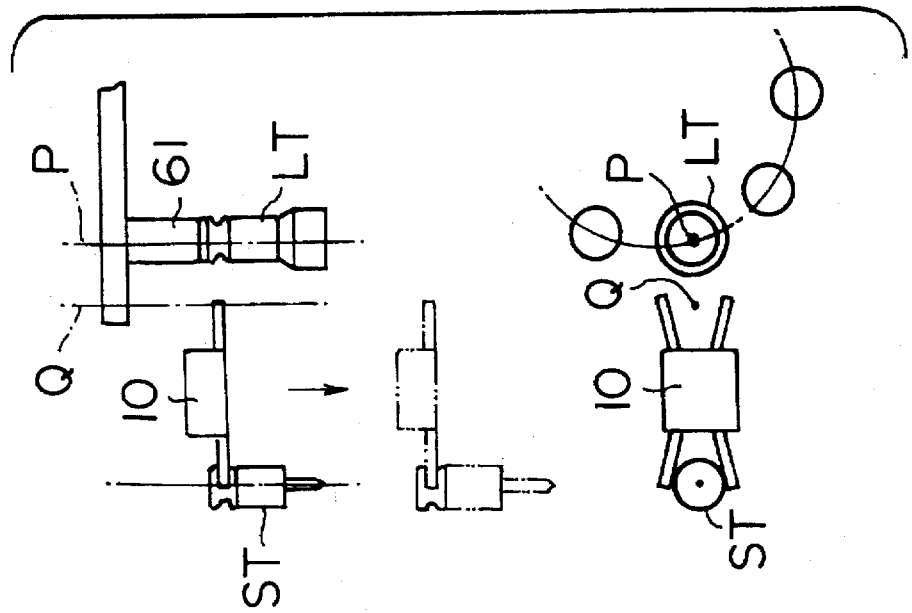
Figure 13D:
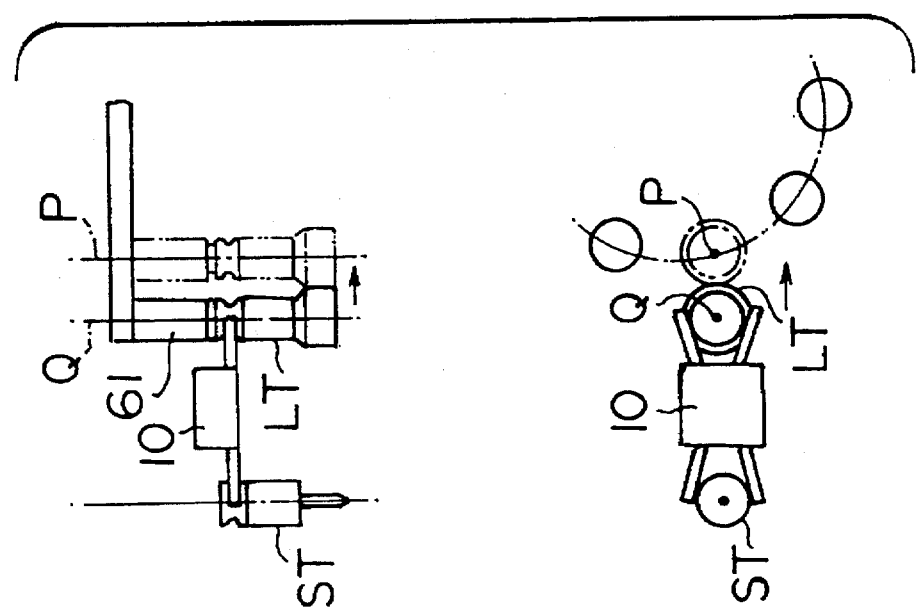

Since the on-spindle tool has previously been identified as the large type tool LT by the controller 200 in step S2, the pot extracting mechanism 56 transfers the large type tool LT removed from the spindle 4 from the tool change position Q to the standby position P after the completion of the tool changing operation in step S9 as shown in FIG. 13(d), and then the headstock 5 is lowered to a machining position in step S10 as shown in FIG. 13(e) without interference between the large type tool LT and the grippers 9.

Figure 14C:
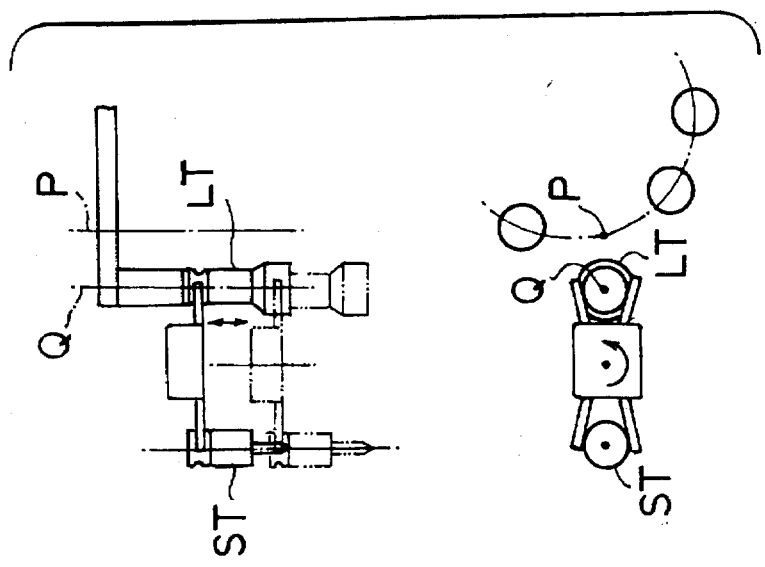
FIGS. 14(a) to 14(e) are diagrammatic views for assistance in explaining a tool changing operation.
Figure 14B:
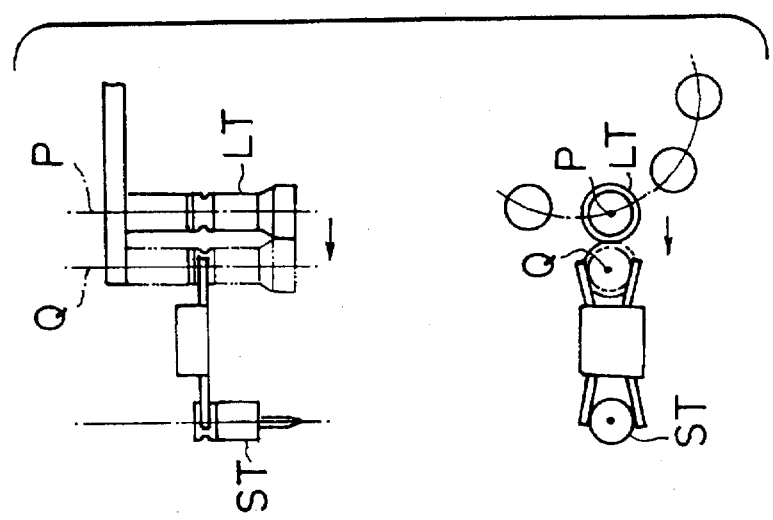
Figure 14A:
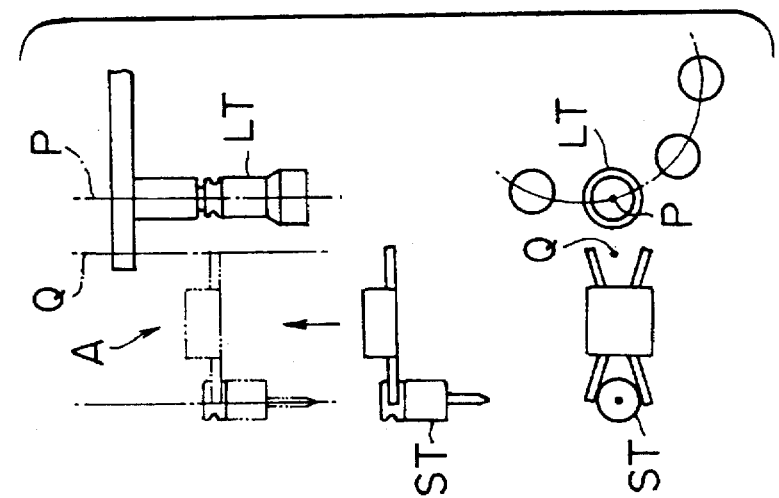
Figure 14E:
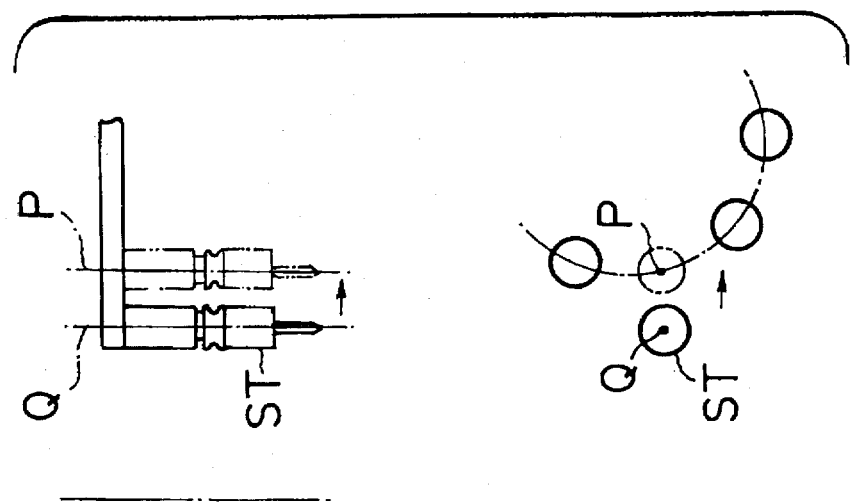
Figure 14D:
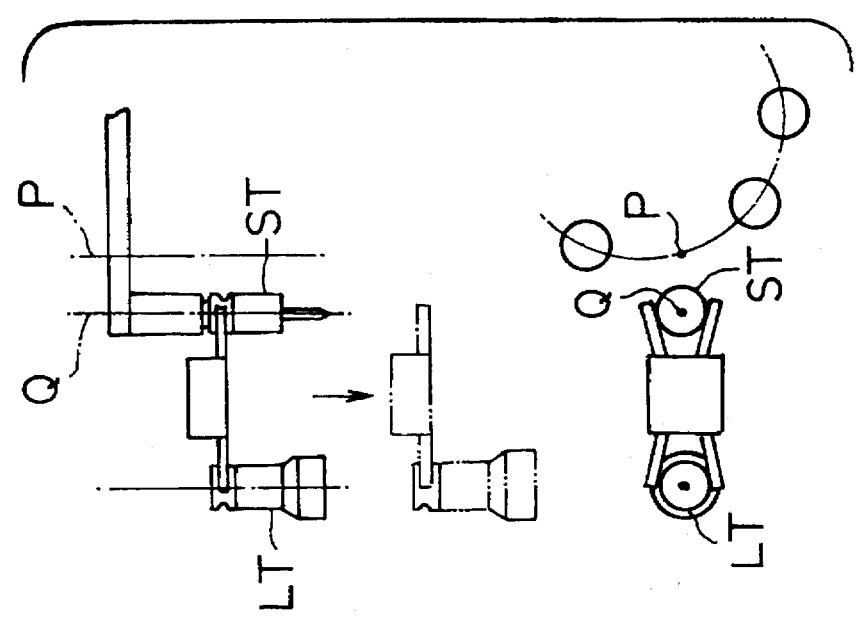

The tool changing method will be described with reference to FIGS. 14(a) to 14(e) on an assumption that the on-spindle tool held on the spindle 4 is a small type tool ST and the next tool is a large type tool LT. In step S2, the controller 200 identifies the next tool as a large type tool LT in step S2. As shown in FIG. 14(a), the feed mechanism 55 positions the next large type tool LT at the standby position P in step S3 during machining operation using the on-spindle small type tool ST. When a tool changing instruction is given in step S5, the headstock 5 is raised to the tool change position A in step S6, and then the pot extracting mechanism 56 transfers the next large type tool LT from the standby position P to the tool change position Q in step S7 as shown in FIG. 14(b). Subsequently, as shown in FIG. 14(c), the tool changing head 10 carries out the predetermined tool changing operation in step S8 to replace the on-spindle small type tool ST with the next large type tool LT. Since the on-spindle tool has previously been identified as a small type tool ST by the controller 200 in step S2, the headstock 5 is lowered to a machining position in step S10 without interference between the small type tool ST and the grippers 9, immediately after the completion of the tool changing operation as shown in FIG. 14(d). Subsequently, the pot extracting mechanism 56 transfers the small type tool ST removed from the spindle 4 from the tool change position Q to the standby position P in step S11 as shown in FIG. 14(e).

When both the on-spindle tool and the next tool are of the large type, steps illustrated in FIGS. 14(a), 14(b), 14(c), 13(d) and 13(e) are executed sequentially in that order. When both the on-spindle tool and the next tool are of the small type, steps illustrated in 13(a), 13(b), 13(c), 14(d) and 14(e) are executed sequentially in that order.

When at least either the on-spindle tool or the next tool is of the large type, the motor 30 for driving the tool change shaft lifting mechanism 21, the tool change shaft turning mechanism 22 and the operating rod lifting mechanism 23 is operated by the controller 20 (FIG. 6) at an operating speed lower than that at which the motor 30 is operated when both the on-spindle tool and the next tool are of the small type.

As is apparent from the foregoing description, the tool changing apparatus in accordance with the present invention is capable of handling large type tools of 75 mm in tool diameter necessary for machining light alloy workpieces without interference between the grippers and the large type tools. When the angular stroke S of the two pairs of grippers 9 is determined so that the pair of grippers make only a movement enough for the pair of grippers to grip the small type tool ST of 53 mm in tool diameter, the time required for the pair of grippers 9 to operate to grip and release the tool can be suppressed to a minimum. Further, since the next tool is transferred from the standby position P to the tool change position Q immediately before carrying out the tool changing operation only when the next tool is of the large type, and since the tool is transferred from the tool change position Q to the standby position P after the completion of the tool changing operation before lowering the headstock 5 toward a machining position only when the on-spindle tool is of the large type, the idle time of the machining center 1 is shorter than that of a machining center provided with the conventional tool changing apparatus. Furthermore, since the tool changing operation for replacing the on-spindle tool with the next tool in the case where either the on-spindle tool or the next tool is of the large type is carried out at a tool changing speed lower than that at which the tool changing operation is carried out in the case where both the tools are of the small type, excessively large force will not be exerted on the component parts, such as the tool changing shaft and the tool changing head 10, of the tool changing device and the tool will not fall off the pair of grippers during the tool changing operation.

The tool magazine 7 may be installed on a stationary column and may be used in combination with machine tools other than the vertical machining center 1, such as horizontal machining centers and boring machines.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tool changing method for a machining center comprising a column, a tool magazine for storing a plurality of tools and for positioning a desired one of the tools at a standby position and of transferring the tool from the standby position to a tool change position, a headstock slidably supported on the column so as to slide along an axis of a spindle held thereon, and a tool changing head mounted on the headstock so as to be turnable about and to be moved toward and away from the axis of the spindle, said tool changing head being provided with two pairs of grippers respectively extended in opposite directions such that one of the two pairs of grippers is positioned to grip a tool held on the spindle when the headstock is positioned at a position corresponding to the tool change position in response to a tool changing instruction and the other pair of grippers is positioned to grip the next tool positioned at the tool change position, whereby the tool changing head carries out a predetermined tool changing operation, said tool changing method comprising:

classifying the tools into small type tools and large type tools with reference to a predetermined threshold tool diameter determined on the basis of the stroke of the pairs of grippers;

positioning a next tool at the standby position, and moving the same to the tool change position before the headstock of the machining center has been moved to the position corresponding to the tool change position in response to a tool changing instruction, when the next tool is of the small type;

positioning and holding the next tool at the standby position, moving the next tool from the standby position to the tool change position after the headstock has been moved to the position corresponding to the tool change position in response to a tool changing instruction, and carrying out the tool changing operation when the next tool is of the large type;

carrying out the tool changing operation, moving the headstock, immediately after completion of the tool changing operation to a machining position, and then moving the tool removed from the spindle from the tool change position to the standby position, when the tool removed from the spindle is of the small type; and carrying out the tool changing operation, and moving the headstock to the machining position after moving the tool removed from the spindle from the tool change position to the standby position, when the tool removed from the spindle is of the large type.

2. A tool changing method according to claim 1, wherein tools that can be moved through a space between the grippers in an open position of the grippers are classified as those of small type, and the tools that cannot be moved through the same space are classified as those of the large type.

3. A tool changing method according to claim 1, wherein the small type tools of a weight exceeding a predetermined threshold weight are classified as large type tools, and the tool changing operation for replacing an on-spindle tool mounted on the spindle with a next tool, in a case where at least one of the on-spindle tool and the next tool is of the large type, is carried out at a tool changing speed lower than a tool changing speed in a case where both the tools are of the small type.

4. A tool changing apparatus to be used in combination with a machining center comprising a column, a tool magazine for storing a plurality of tools and positioning a desired one of the tools at a standby position and for transferring the one tool from the standby position to a tool change position, a headstock slidably supported on the column so as to slide along an axis of a spindle held thereon, a tool changing head mounted on the headstock so as to be turnable about and to be moved toward and away from an axis of the spindle, said tool changing head being provided with two pairs of grippers respectively extended in opposite directions such that one of the two pairs of grippers is positioned to grip a tool held on the spindle when the headstock is located at a position corresponding to said tool change position in response to a tool changing instruction and the other pair of grippers is positioned to grip a next tool positioned at the tool change position, whereby the tool changing head carries out a predetermined tool changing operation, said tool changing apparatus comprising control means including:

storage means for storing types of tools classified into small type tools and large type tools with reference to a predetermined threshold tool diameter determined on the basis of stroke of the two pairs of grippers;

type identifying means for identifying the respective types of an on-spindle tool mounted on the spindle and a next tool to be used;

small type tool feed instruction issuing means for issuing a small type tool feed instruction to move the next tool from the standby position to the tool change position before the headstock is moved to a position corresponding to the tool change position, when the next tool is of the small type;

large type tool feed instruction issuing means for issuing a large type tool feed instruction to move the next tool from the standby position to the tool change position after the headstock has been moved to the position corresponding to the tool change position, when the next tool is of the large type;

small type tool return instruction issuing means for issuing a small tool return instruction to return the tool removed from the spindle by the tool changing operation from the tool change position to the standby position after the headstock has been moved toward a machining position, when the on-spindle tool removed from the spindle is of the small type; and large type tool return instruction issuing means for issuing a large tool return instruction to return the on-spindle tool removed from the spindle by the tool changing operation from the tool change position to the standby position before the headstock is moved toward a machining position, when the on-spindle tool is of the large type.

5. A tool changing apparatus according to claim 4, wherein said control means further includes means for carrying out the tool changing operation at a reduced speed when said type identifying means issues a signal indicating that at least one of the tool on the spindle and the next tool is of the large type.

* * * * *